Patented Apr. 3, 1928.

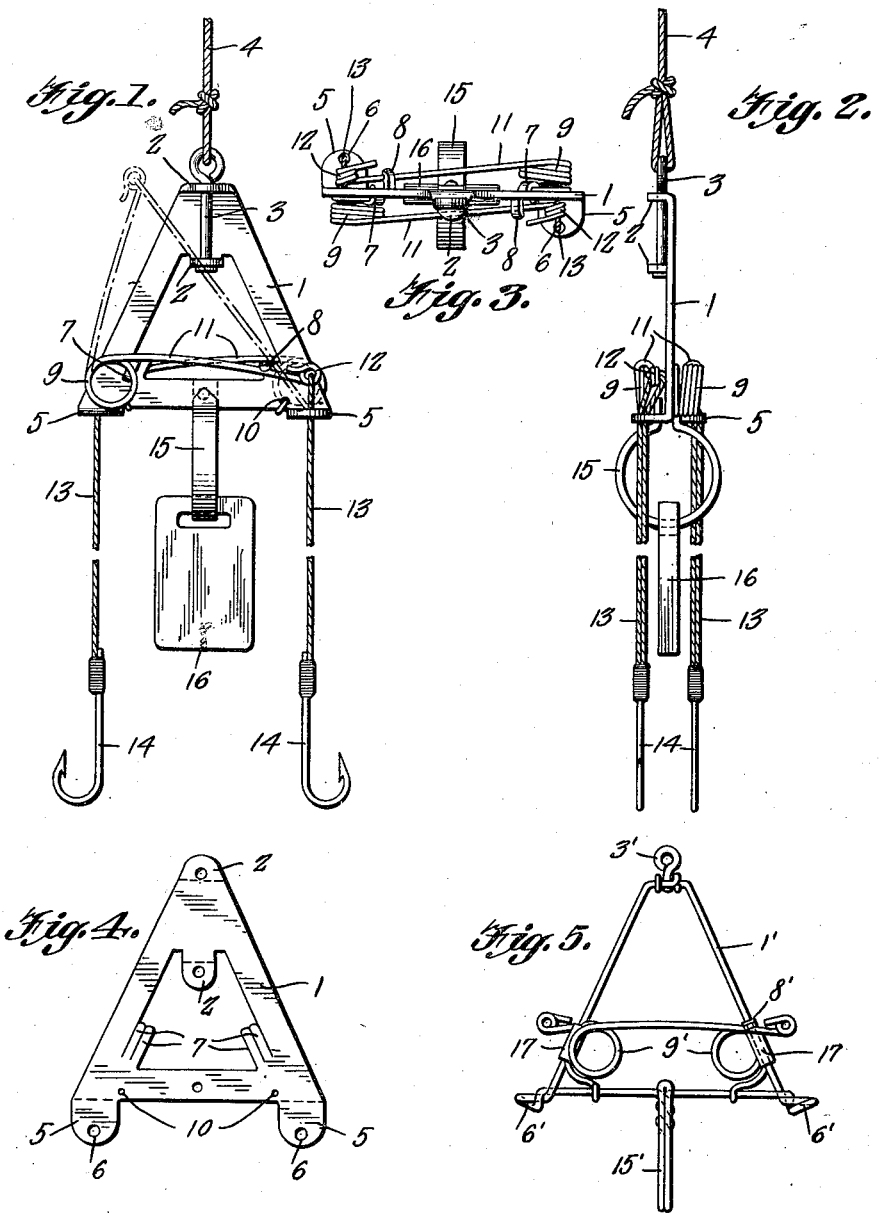

1,665,144

UNITED STATES PATENT OFFICE.

MILTON MURRAY, OF WILLIAMS WHARF, VIRGINIA.

FISHING-TACKLE ATTACHMENT.

Application filed March 5, 1927. Serial No. 173,128.

This invention relates to an attachment for fishing tackle, the general object of the invention being to provide means whereby the snell or hook carrying member will be given a jerk by a spring when a fish nibbles upon the bait, thereby impaling the fish on the hook, and said spring also acts to keep the snell taut as the fish struggles to release himself, thus preventing the fish slackening the snell, which might permit him to eject the hook.

Another object of the invention is to so form the device that a slight pull on the snell will release the spring from its holding member automatically.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of one form of the invention, showing the same in use.

Figure 2 is a side view thereof.

Figure 3 is a top plan view.

Figure 4 is a view of the blank from which the frame is made.

Figure 5 is a view of a modification, in which the frame is formed of wire.

Referring to Figures 1 to 4, 1 indicates a frame of triangular shape and formed of pressed metal or the like, the frame being provided with a pair of ears 2 at its top which are adapted to be bent at right angles to the frame and which are perforated to receive the swivel rod 3 which has an eye at its upper end to receive the line 4. Thus the frame is rotatably connected with the line 4. An ear 5 is formed at each lower corner of the frame, these ears being bent at right angles to the frame in opposite directions and each ear is provided with a hole 6. A pair of tongues 7 is formed in each lower corner of the opening of the frame, one tongue of each pair being bent to form a hook 8 and the other tongue of each pair being bent around the base part of a spring coil 9 to hold the coil to the frame. The coil is also fastened to the frame by having its end passed through a hole 10 formed in the bottom part of the frame. The other end of the coil is extended to form an arm 11, the extremity of which is twisted to provide an eye 12. The coil and its arm are so arranged that the arm can move in a path which is beyond the end of the hook 8, but by pushing the arm toward the frame, it will be engaged by the hook so that said hook will hold the arm under tension and in a horizontal position. The snells or hook carrying members 13 are attached to the arms by being passed through the eyes 12 and when the arm is held under tension by the hook 8, its eye will be offset from the hole 6 in the ear 5 through which the snell passes so that a slight pull on the fishing hook 14, which is fastened to the snell, will pull the arm downwardly and said arm will also move laterally away from the frame, due to the offset arrangement of the hole 6 and the tendency of the arm to move outwardly away from the frame. Thus the arm will be released from the hook so that it will swing upwardly to a vertical position under the action of the coil and thus the snell will be given a jerk, which will cause the hook 14 to snag the fish. As the fish starts to swim away from the device in an attempt to free himself, the arm will be pulled downwardly, thus exerting a tension on the snell, which will act to check the fish and when the fish swims toward the device, the snell will be kept taut by the spring action of the arm and coil. Thus it will be seen that the device will act to cause the fishing hook to snag the fish as soon as the fish nibbles upon the bait and after the fish is caught, the device will keep the snell taut and thus prevent the fish from freeing himself.

A hook 15 is formed with or connected to the lower part of the frame and is designed to support one or more weights 16 for causing the device to sink.

Figure 5 shows the frame 1' formed of wire with the swivel 3' attached to its top and the coils 9' attached to its sides by the clips 17, with the ends of the coils fastened to the bottom piece of the frame. The eyes 6' are formed by twisting the corners of the frame and the hook 15' is formed with or connected to the bottom piece. The hooks 8' are carried by the clips 17. In other respects, this form of the invention is the same as that first described.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a frame, a coiled spring carried by the frame and having one end forming a spring arm, a hook on the frame for holding the arm in lowered position and under tension, said hook being offset from the arm so that the arm must be moved laterally to engage it with the hook, a hook carrying member connected with the free end of the arm and guiding means for said member offset from the arm when the arm is in engagement with the hook.

2. A device of the class described comprising a frame, a coiled spring carried by the frame and having one end forming a spring arm, a hook on the frame for holding the arm in lowered position and under tension, said hook being offset from the arm so that the arm must be moved laterally to engage it with the hook, a hook carrying member connected with the free end of the arm and the frame having a guiding opening therein for the hook carrying member which is offset from the arm when the arm is in engagement with the hook.

3. A device of the class described comprising a frame, a swivel at the top of the frame, a hook attached to the bottom of the frame and adapted to receive a weight, a spring arm carried by the frame, a hook on the frame for holding the arm under tension, a hook carrying member connected with the free end of the arm and means for causing the arm to be released by the hook when a slight pull is exerted on the hook carrying member.

In testimony whereof I affix my signature.

MILTON MURRAY.